US009727421B2

(12) United States Patent
Ljubuncic et al.

(10) Patent No.: US 9,727,421 B2
(45) Date of Patent: Aug. 8, 2017

(54) TECHNOLOGIES FOR DATA CENTER ENVIRONMENT CHECKPOINTING

(71) Applicant: Intel Corporation, Santa Clara, CA (US)

(72) Inventors: Igor Ljubuncic, London (GB); Ravi A. Giri, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 14/748,650

(22) Filed: Jun. 24, 2015

(65) Prior Publication Data

US 2016/0378611 A1    Dec. 29, 2016

(51) Int. Cl.
*G06F 11/00* (2006.01)
*G06F 11/14* (2006.01)

(52) U.S. Cl.
CPC ...... *G06F 11/1451* (2013.01); *G06F 11/1469* (2013.01); *G06F 2201/84* (2013.01)

(58) Field of Classification Search
CPC ............. G06F 11/1451; G06F 11/1469; G06F 2201/84
See application file for complete search history.

(56) References Cited

U.S. PATENT DOCUMENTS

| | | | |
|---|---|---|---|
| 6,401,216 B1* | 6/2002 | Meth | G06F 11/1458 712/228 |
| 6,594,779 B1* | 7/2003 | Chandra | G06F 11/1438 714/15 |
| 2006/0136672 A1* | 6/2006 | Chaudhry | G06F 11/165 711/122 |
| 2006/0236152 A1* | 10/2006 | Archer | G06F 11/1438 714/16 |
| 2008/0243956 A1* | 10/2008 | Yamamoto | G06F 11/1469 |
| 2010/0037096 A1* | 2/2010 | Bum | G06F 11/1438 714/19 |
| 2013/0179729 A1* | 7/2013 | Chiu | G06F 12/16 714/19 |
| 2013/0204843 A1* | 8/2013 | Boldo | G06F 11/1471 707/649 |
| 2015/0205671 A1* | 7/2015 | Bissett | G06F 11/1484 714/15 |
| 2015/0205672 A1* | 7/2015 | Bissett | G06F 11/1407 714/18 |
| 2016/0124814 A1* | 5/2016 | Joseph | G06F 11/1464 714/19 |
| 2016/0139943 A1* | 5/2016 | Bezbaruah | G06F 9/45558 718/1 |
| 2016/0179627 A1* | 6/2016 | Dusi | G06F 11/1451 714/19 |
| 2017/0046231 A1* | 2/2017 | Schreter | G06F 17/30575 |

* cited by examiner

*Primary Examiner* — Joshua P Lottich
(74) *Attorney, Agent, or Firm* — Barnes & Thornburg LLP

(57) ABSTRACT

Technologies for environment checkpointing include an orchestration node communicatively coupled to one or more working computing nodes. The orchestration node is configured to administer an environment checkpointing event by transmitting a checkpoint initialization signal to each of the one or more working computing nodes that have been registered with the orchestration node. Each working computing node is configured to pause and buffer any presently executing applications, save checkpointing data (an execution state of each of the one or more applications) and transmit the checkpointing data to the orchestration node. Other embodiments are described and claimed.

25 Claims, 8 Drawing Sheets

US 9,727,421 B2

TECHNOLOGIES FOR DATA CENTER ENVIRONMENT CHECKPOINTING

BACKGROUND

Many large-scale computing environments such as high-performance computing (HPC) and cloud computing environments may incorporate distributed or multi-tier applications and workloads. In other words, more than one instance of a workload may be executing at the same time across multiple applications and/or computing devices (e.g., servers). Crashes or other errors occurring in the course of processing such distributed workloads may cause the loss of application state and thus may require large amounts of computational work to be repeated. Accordingly, crashes in large-scale computing environments may be quite costly and time-consuming.

Some HPC and cloud computing environments support software-based application checkpointing. Typical application checkpointing solutions are purely software-based and allow the computing environment to store periodic snapshots (i.e., checkpoints) of the state of a running application, a virtual machine, or a workload in a non-distributed or single-tier computing environment. Based on the saved checkpoints, a suspended or interrupted application may be resumed or replayed starting from the state of a saved checkpoint, which may allow for quicker or less-expensive crash recovery. However, software checkpointing support may require the checkpointing software to be re-engineered for each supported application and/or operating system. Further, such software-based checkpointing solutions (e.g., hypervisors, virtual machine monitors, etc.) are typically dependent on various factors of the single-tier or non-distributed environment, such as the vendor, the operating system, the type of virtual machine, the application, etc.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
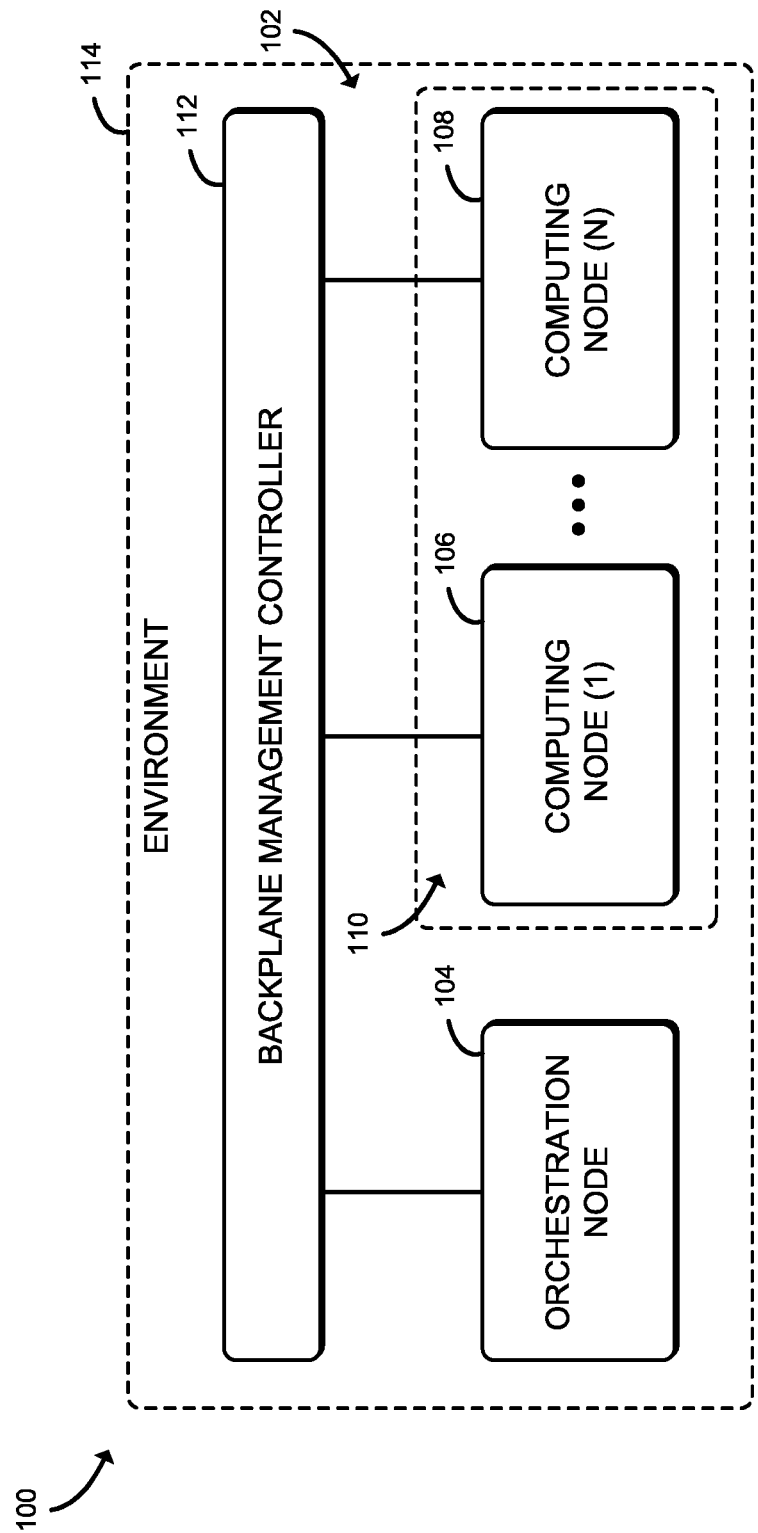
FIG. 1 is a simplified block diagram of at least one embodiment of a system for supporting data center environment checkpointing that includes an orchestration node and working computing nodes.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for data center environment checkpointing includes a plurality of computing nodes 102 communicatively coupled via a backplane management controller 112 in a compute environment 114. Each of the plurality of computing nodes 102 is capable of executing one or more applications, or services, and responding to checkpointing events. The illustrative computing nodes 102 include an orchestration node 104 for managing resources (e.g., central processing unit (CPU) resources, storage resources, network resources) and/or distributing workloads across working computing nodes 110 (e.g., illustratively, the computing nodes 106, 108), which are registered with the orchestration node 104. The illustrative working computing nodes 110 include a first computing node, which is designated as computing node (1) 106, and a second computing node, which is designated as computing node (N) 108 (i.e., the "Nth" computing node of the working computing nodes 110, wherein "N" is a positive integer and designates one or more additional computing nodes 110 that are registered with the orchestration node 104).

Each of the plurality of computing nodes 102 is capable of executing one or more applications and includes hardware capable of supporting checkpointing (i.e., hardware-assisted checkpointing support). Hardware checkpointing support may allow for improved checkpointing performance, reliability, and scalability compared to software-only implementations. Additionally, because hardware checkpointing may be transparent to executing applications, checkpointing support may be provided for existing applications without requiring re-engineering (e.g., modifying code, recompiling code, etc.) of the underlying software.

The orchestration node 104 is additionally configured to administer an environment checkpointing event. To do so, in use, the orchestration node 104 provides a checkpoint initialization signal, distributed via the backplane management controller 112, to the working computing nodes 110. Each of the working computing nodes 110 that receive the checkpoint initialization signal pauses the execution of local applications (i.e. workload processing processes, threads, virtual machines, etc.) presently running on the corresponding working computing node 110, atomically saves the states of the paused applications (i.e., application checkpointing data) using the hardware checkpoint support, and transmits the application checkpointing data back to the orchestration node 104. The orchestration node 104 then aggregates the application checkpointing data received from each of the working computing nodes 110 and, upon having received the application checkpointing data from all of the working computing nodes 110, provides a checkpoint complete signal to the working computing nodes 110 to indicate to the working computing nodes 110 that they may resume execution of the previously paused applications.

While one of the computing nodes 102 is designated as the orchestration node 104, it should be appreciated that any of the working computing nodes 110 (i.e., illustratively, the computing node 106 or the computing node 108) of the compute environment 114 may be capable of performing as an orchestration node 104, such as in the event of a failure of the designated orchestration node 104. As such, any computing node 102 of the compute environment 114 may be designated as the "orchestration" node and is referred to as such in the following description.

In some embodiments, the plurality of computing nodes 102 and the backplane management controller 112 (i.e., the compute environment 114) may be configured in a physical housing that facilitates the communication enabling connections between the computing nodes 102 and the backplane management controller 112. For example, the physical housing may be a rack in a rack-mounted configuration (i.e., the computing nodes 102 are rack-mounted servers), a blade server chassis in a blade server configuration (i.e., the computing nodes 102 are blade servers), or any other type of physical housing capable of facilitating the communication enabling connections between the computing nodes 102 and the backplane management controller 112. Accordingly, the compute environment 114 may additionally include various other components, such as power supplies, fans, etc., which are not illustrated herein for clarity of the description. It should be appreciated, however, that in some embodiments, the process and/or workload distribution may not be self-contained to just the computing nodes 102 on the rack or in the chassis, such as in a cross-rack orchestration or a cross cloud orchestration, for example. In such embodiments, the compute environment 114 may encompass the various network devices and computing nodes 102 associated with the cross-rack orchestration or the cross cloud orchestration.

The backplane management controller 112 may be embodied as any type of circuitry and/or components capable of performing the functions described herein, such as an enclosure management controller (EMC), a baseboard management controller (BMC), a chassis management controller (CMC), or any type of backplane management controller capable of facilitating the backend connectivity and transmission of communications across the computing nodes 102, such as between the orchestration node 104 and the working computing nodes 110.

Figure 2:
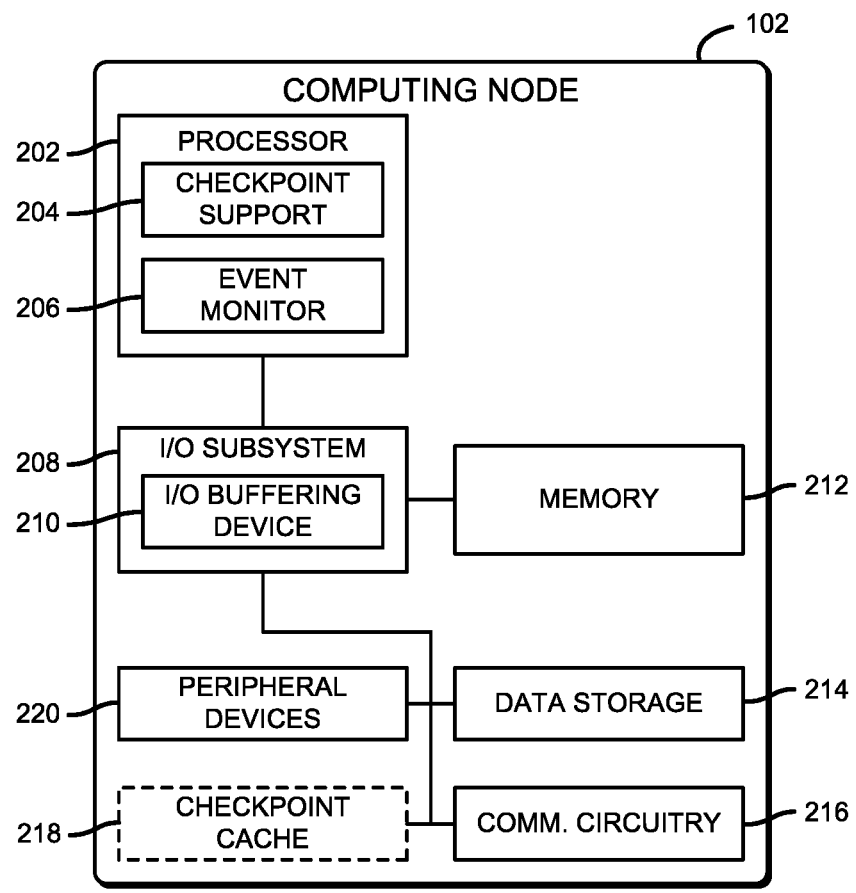
FIG. 2 is a simplified block diagram of at least one embodiment of a computing node of the system of FIG. 1.

The computing nodes 102 may be embodied as any type of computation or computer device capable of performing the functions described herein, including, without limitation, a computer, a multiprocessor system, a server, a rack-mounted server, a blade server, a smartphone, a tablet computer, a laptop computer, a notebook computer, a mobile computing device, a wearable computing device, a network appliance, a web appliance, a distributed computing system, a processor-based system, and/or a consumer electronic device. As shown in FIG. 2, one of the computing nodes 102 illustratively includes a processor 202, an input/output (I/O) subsystem 208, a memory 212, a data storage device 214, and communication circuitry 216. Of course, the computing node 102 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 212, or portions thereof, may be incorporated in the processor 202 in some embodiments.

The processor 202 may be embodied as any type of processor capable of performing the functions described herein. For example, the processor 202 may be embodied as a single or multi-core processor(s), digital signal processor, microcontroller, or other processor or processing/controlling circuit. The processor 202 illustratively includes hardware checkpoint support 204 and a hardware event monitor 206. The hardware checkpoint support 204 may be embodied as any hardware component, microcode, firmware, or other component of the processor 202 capable of saving the execution state (e.g., a virtual memory state) of a currently executing application. For example, the hardware checkpoint support 204 may be embodied as one or more dedicated processor instructions and associated memory management functions of the processor 202 that causes all or part of the virtual memory space of the current application to be saved to nonvolatile storage. In some embodiments, the hardware checkpoint support 204, or a portion thereof, may be embodied as firmware or software executable by the processor 202 or other component of the computing node 102. In such embodiments, the hardware checkpoint support 204 (or instructions thereof) may be stored in memory (e.g., the memory 212).

The hardware event monitor 206 may be embodied as any hardware component, microcode, firmware, or other component of the processor 202 capable of notifying software executed by the processor 202 of system events occurring within the processor 202, such as memory access events, cache access events, and/or checkpointing events. For example, the hardware event monitor 206 may be embodied as one or more performance counters, performance monitoring units, cache monitoring units, or other hardware counters of the processor 202. In some embodiments, the computing node 102 may facilitate the orchestration of the checkpointing event through a main platform firmware, or pre-boot firmware, such as an extension of the Intel platform chipset or the platform Basic Input/Output System (BIOS) based on the Unified Extensible Firmware Interface ("UEFI") specification, which has several versions published by the Unified EFI Forum. In such embodiments, the BIOS may reside in the memory 212 and include instructions to initialize the computing node 102 during the boot process. In some embodiments, the hardware event monitor 206, or a portion thereof, may be embodied as firmware or software executable by the processor 202 or other component of the computing node 102. In such embodiments, the hardware event monitor 206 (or instructions thereof) may be stored in memory (e.g., the memory 212).

The memory 212 may be embodied as any type of volatile or non-volatile memory or data storage capable of performing the functions described herein. In operation, the memory 212 may store various data and software used during operation of the computing node 102 such as operating systems, applications, programs, libraries, and drivers. The memory 212 is communicatively coupled to the processor 202 via the I/O subsystem 208, which may be embodied as circuitry and/or components to facilitate input/output operations with the processor 202, the memory 212, and other components of the computing node 102. For example, the I/O subsystem 208 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 208 further includes an I/O buffering device 210. The I/O buffering device 210 may be embodied as any hardware component, microcode, firmware, or other component of the I/O subsystem 208 that is capable of buffering I/O signals during a checkpointing event and notifying software executed by the processor 202 of system I/O events occurring within the computing node 102, such as disk access events, memory access events, network access events, checkpointing events, or other system events. For example, the I/O buffering device 210 may be embodied as one or more bit identifiers, performance counters, performance monitoring units, or other hardware counters of the I/O subsystem 208. In some embodiments, the I/O subsystem 208 may form a portion of a system-on-a-chip (SoC) and be incorporated, along with the processor 202, the memory 212, and other components of the computing node 102, on a single integrated circuit chip.

The data storage device 214 may be embodied as any type of device or devices configured for short-term or long-term storage of data such as, for example, memory devices and circuits, memory cards, hard disk drives, solid-state drives, or other data storage devices. In use, as described below, the data storage device 214 may store application checkpointing data such as saved execution states or other, similar data. The communication circuitry 216 of the computing node 102 may be embodied as any communication circuit, device, or collection thereof, capable of enabling communications between the computing node 102 and the orchestration node 104, and between the computing node 102 and remote devices over a network (not shown). The communication circuitry 216 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing node 102 may also include a checkpoint cache 218. Similar to the data storage device 214, the checkpoint cache 218 may be embodied as any type of device or devices configured for short-term or long-term storage of data such as, for example, memory devices and circuits, memory cards, hard disk drives, solid-state drives, or other data storage devices. For example, in some embodiments, the checkpoint cache 218 may be embodied as a flash-based memory storage device for storing persistent information. The checkpoint cache 218 may store application checkpointing data such as saved execution states or other, similar data.

In some embodiments, the computing node 102 may also include one or more peripheral devices 220. The peripheral devices 220 may include any number of additional input/output devices, interface devices, and/or other peripheral devices. For example, in some embodiments, the peripheral devices 220 may include a display, touch screen, graphics circuitry, keyboard, mouse, speaker system, and/or other input/output devices, interface devices, and/or peripheral devices.

Figure 3:
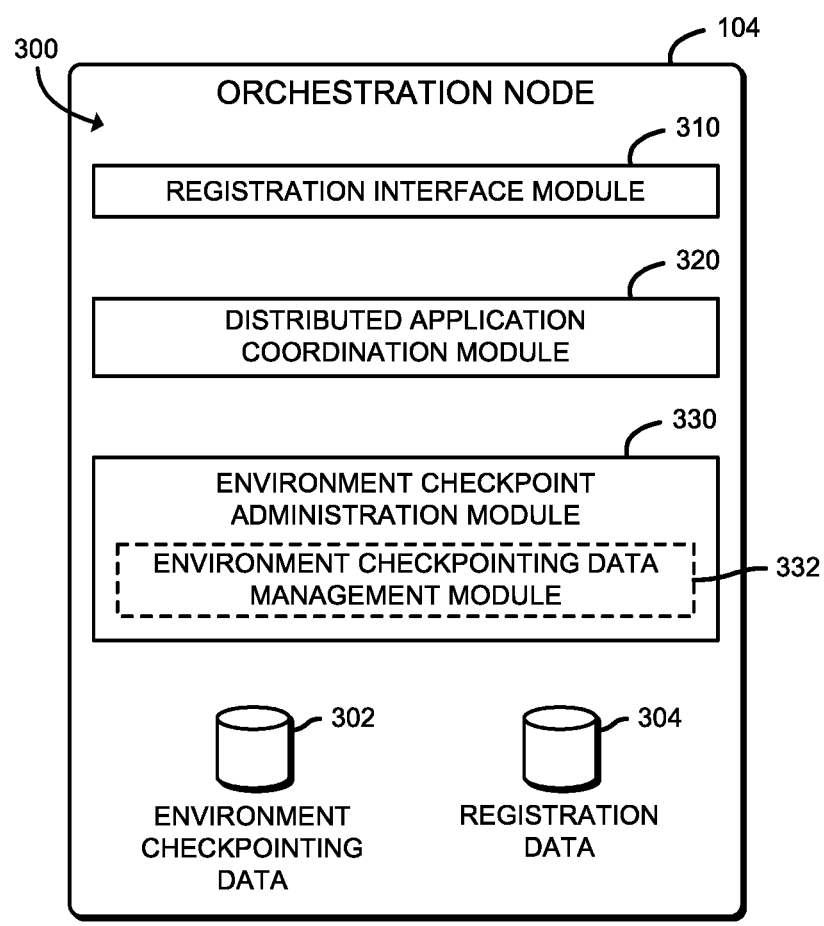
FIG. 3 is a simplified block diagram of at least one embodiment of an environment that may be established by the orchestration node of FIG. 1.
Figure 4:
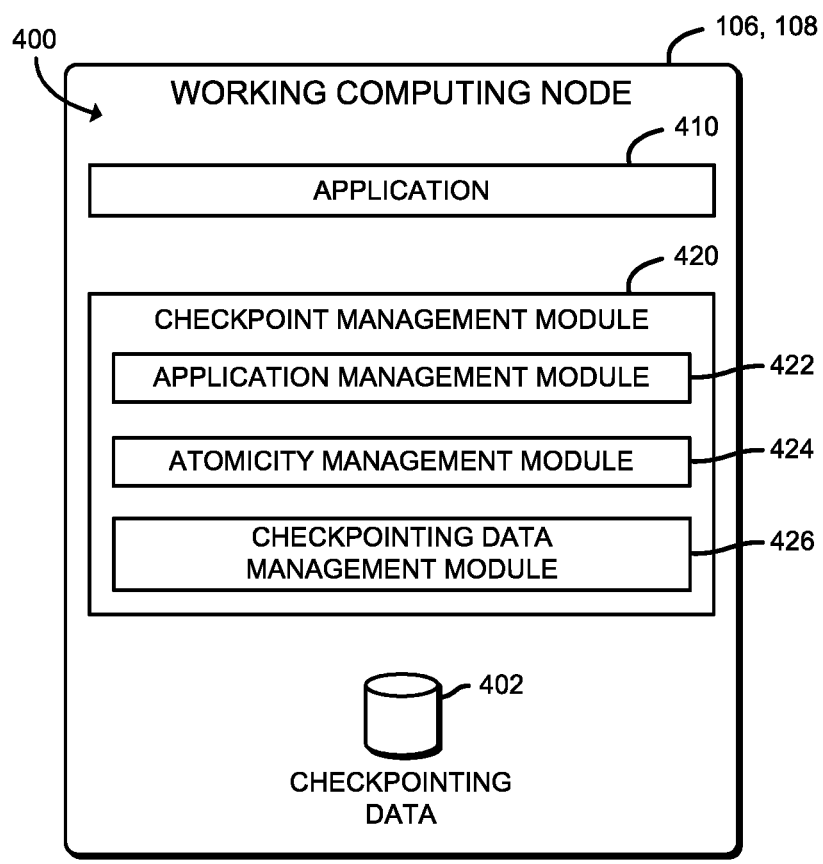
FIG. 4 is a simplified block diagram of at least one embodiment of an environment that may be established by at least one of the additional computing nodes of FIG. 2.

As described previously, each of the computing nodes 102 of FIG. 1 are capable of being configured as the orchestration node 104 or one of the working computing nodes 110 (i.e., illustratively, the computing nodes 106, 108). Accordingly, environments that may be established during operation of the computing nodes 102, as shown in FIGS. 3 and 4, are dependent on whether a particular computing node 102 is functioning as the orchestration node 104 or one of the working computing nodes 110. Referring now to FIG. 3, in an illustrative embodiment, the orchestration node 104 establishes an environment 300 during operation. The illustrative environment 300 includes a registration interface module 310, a distributed application coordination module 320, and an environment checkpoint administration module 330.

Each of the modules, logic, and other components of the environment 300 may be embodied as hardware, software, firmware, or a combination thereof. For example, each of the modules, logic, and other components of the environment 300 may form a portion of, or otherwise be established by, the processor 202 or other hardware components of the orchestration node 104. As such, in some embodiments, one or more of the modules of the environment 300 may be embodied as a circuit or collection of electrical devices (e.g., a registration interface circuit, a distributed application coordination circuit, an environment checkpoint administration circuit, etc.). In some embodiments, the registration interface module 310, the distributed application coordination module 320, and/or the environment checkpoint administration module 330 may be embodied as one or more components of a virtualization framework of the orchestration node 104 such as a hypervisor or virtual machine monitor (VMM). It should be appreciated that the orchestration node 104 may include other components, sub-components, modules, sub-modules, and devices commonly found in a computing device, which are not illustrated in FIG. 3 for clarity of the description.

In the illustrative environment 300, the orchestration node 104 additionally includes environment checkpointing data 302 and registration data 304, each of which may be accessed by one or more of the various modules and/or sub-modules of the orchestration node 104. In some embodiments, the environment checkpointing data 302 may include a hash table of the state of various connections and processes associated with each distributed application (i.e., master persistency). In some embodiments, the environment checkpointing data 302 may be transmitted by the orchestration node 104 to the working computing nodes 110 (i.e., environment persistency).

The registration interface module 310 is configured to receive registration information from the working computing nodes 110 that includes identification information related to the working computing nodes 110, such as a computing node identifier, a process identifier, a virtual machine identifier, etc. The registration interface module 310 is further configured to register the working computing nodes 110 with the orchestration node 104 based on the received registration information. The registration information may include computing node identification data, application (see application 410 of FIG. 4) related data, such as thread or process identifiers (e.g., names, IDs, etc.). The registration interface module 310 may store the received registration information in the registration data 304.

The distributed application coordination module 320 is configured to coordinate (i.e., spawn, distribute, monitor, adjust, allocate resources, terminate, etc.) each application, hypervisor, or master thread of a distributed application to be performed at the working computing nodes 110. To do so, the distributed application coordination module 320 is configured to initiate applications, record dependencies, and generate child thread identifiers and/or connection identifiers based on objects registered by the working computing nodes 110 for the initiated applications, such as the registration information received and registered at the registration interface module 310. Additionally, the distributed application coordination module 320 may be further configured to coordinate (i.e., track) the various signals and events triggered by and/or received at the orchestration node 104.

The environment checkpoint administration module 330 is configured to administer atomic checkpointing operations and track the checkpointing operations across the working computing nodes 110. As described previously, the computing nodes 102 may span a rack, a blade, a data center, or any number of cloud-provider environments. Accordingly, the environment checkpoint administration module 330 is configured to transmit a checkpoint initialization signal that includes time sync information to the working computing nodes 110 of the compute environment 114 that are presently registered with the orchestration node 104. The environment checkpoint administration module 330 is further configured to receive checkpointing information (e.g., application state information) from each other working computing node 110 registered with the orchestration node 104 upon completion of the checkpointing event at each other working computing node 110. Upon receipt, the environment checkpoint administration module 330 stores the checkpointing information, which may be aggregated with previously received checkpointing data from other computing nodes 102 of the compute environment 114. In some embodiments, the received checkpointing data may be stored in the environment checkpointing data 302. Accordingly, the environment checkpointing data 302 may include checkpointing information related to each other working computing node 110 of the compute environment 114 registered with the orchestration node 104, such as child process (thread) information, connection information, virtual memory contents, processor register state, processor flags, process tables, file descriptors, file handles, or other data structures relating to the current state of the application running on the working computing nodes 110 at the time that the checkpoint initialization signal was received at the working computing nodes 110. In some embodiments, those functions may be performed by one or more sub-modules, such as an environment checkpointing data management module 332.

Additionally or alternatively, in some embodiments, the environment checkpoint administration module 330 may be further configured to administer a restore event based on the environment checkpointing data 302. In such embodiments, the environment checkpoint administration module 330 may be further configured to restore the execution state (e.g., a virtual memory state) of a distributed application by using the hardware checkpoint support 204 of the processor 202 to restore the execution state based on at least some of the environment checkpointing data 302. For example, the environment checkpoint administration module 330 may transmit a checkpoint restore signal to the working computing nodes 110 to indicate to each of the working computing nodes 110 to pause executing any presently executing applications and start execution of one or more applications based on the checkpoint restore signal and/or any additional environment checkpointing data. It should be appreciated that the presently executing applications paused as a result of the restore operation may or may not be the same applications.

Referring now to FIG. 4, in an illustrative embodiment, each working computing nodes 110 (i.e., illustratively, the computing node 106 or the computing node 108) establishes an environment 400 during operation. The illustrative environment 400 includes an application 410 and a checkpoint management module 420. Each of the modules, logic, and other components of the environment 400 may be embodied as hardware, software, firmware, or a combination thereof. For example, each of the modules, logic, and other components of the environment 400 may form a portion of, or otherwise be established by, the processor 202 or other hardware components of the computing node 102. As such, in some embodiments, one or more of the modules of the environment 400 may be embodied as a circuit or collection of electrical devices (e.g., a checkpoint management circuit, etc.). In some embodiments, the checkpoint management module 420 may be embodied as one or more components of a virtualization framework of the working computing node 110 such as a hypervisor or virtual machine monitor (VMM). It should be appreciated that the computing node 102 may include other components, sub-components, modules, sub-modules, and devices commonly found in a computing device, which are not illustrated in FIG. 4 for clarity of the description.

The application 410 may be embodied as any program, process, thread, task, or other executable component of the working computing node 110. For example, the application 410 may be embodied as a process, a thread, a native code application, a managed code application, a virtualized application, a virtual machine, or any other similar application. In some embodiments, the application 410 may be compiled to target the processor 202 specifically; that is, the application 410 may include code to access the hardware checkpoint support 204, such as via specialized processor instructions. During execution, the application 410 is initialized by a main thread, which maintains and modifies an execution state that may include, for example, a virtual memory state (i.e., virtual memory contents), processor register state, processor flags, process tables, file descriptors, file handles, or other data structures relating to the current state of the application 410. Although illustrated as a single application 410, it should be understood that the environment 400 may include one or more applications 410 executing contemporaneously. It should be appreciated that, in some embodiments, the application 410 may be a distributed application, such that at least a portion of the application processing is performed on a first working computing node 110 (e.g., the computing node 106) and at least another portion of the application processing is performed on another working computing node 110 (e.g., the computing node 108). It should be further appreciated that, in some embodiments, the application 410 may be a multi-tiered application, commonly referred to as an n-tier application, such that the multi-tiered application consists of more than one application developed and distributed among more than one layer (e.g., operational layer).

The checkpoint management module 420 is configured to detect and handle occurrences of checkpointing events (e.g., any hardware or software event that triggers a checkpointing operation) received from an orchestration node 104 communicatively coupled to the working computing node 110. In response to detecting checkpointing events, the checkpoint management module 420 may call one or more hardware hooks (e.g., system calls, processor instructions, etc.) to cause the working computing node 110 to save a checkpoint. To do so, the checkpoint management module 420 is configured to lock the context of the working computing node 110 (i.e., pause further execution of presently executing applications 410 and block newly received data) and buffer the presently executing tasks using an I/O buffering mechanism to ensure that all I/O signals (e.g., memory, disk, network, etc.) are buffered until the working computing node 110 receives an indication that the computing node 102 may resume the paused applications 410. For example, the I/O buffering device 210 may buffer the I/O signals until the working computing node 110 provides an indication to the orchestration node 104 that the requested checkpointing event has completed (i.e., states saved and transmitted to the orchestration node 104) and receives an indication from the orchestration node 104 that the computing node 102 may resume operation, such as via the checkpoint complete signal. Additionally, the checkpoint management module 420 is configured to buffer and save memory pages and states behind the main thread, and flush memory pages and states ahead of the main thread.

The checkpoint management module 420 is further configured to atomically save the execution state of each application 410 (i.e., the checkpointing information) that was being executed by the computing node 102 at the time the checkpointing event signal was received. In the illustrative environment 400, the computing node 102 additionally includes checkpointing data 402, which may be accessed by one or more of the various modules and/or sub-modules of the computing node 102. In some embodiments, the checkpointing information may be saved in the checkpointing data 402. Accordingly, the checkpointing data 402 may include checkpointing related data, such as virtual memory contents, processor register state, processor flags, process tables, file descriptors, file handles, or other data structures relating to the current state of the application 410 at the time of the checkpointing request.

In some embodiments, the functions of the checkpoint management module 420 may be performed by one or more sub-modules, such as an application management module 422 to manage the pausing and restarting of each application 410, an atomicity management module 424 to atomically save the checkpointing information, and a checkpointing data management module 426 to interface with the checkpointing data 402 to store the retrieved checkpointing information and retrieve the checkpointing information for transmission to the orchestration node 104. Additionally, in some embodiments, the checkpoint management module 420 may be further configured to receive and store environment checkpointing data 302 that may be received from the orchestration node 104. In such embodiments, the computing node 102 can be configured to assume the role of orchestration node 104 in the event the computing node 102 presently configured to function as the orchestration node crashes or otherwise fails. Accordingly, the checkpointing data 402 and/or the environment checkpointing data 302 may be stored in the checkpoint cache 218.

Additionally or alternatively, in some embodiments, the checkpoint management module 420 may be further configured to manage a restore event based on the environment checkpointing data 302. In such embodiments, the checkpoint management module 420 may be configured to receive a checkpoint restore signal from the orchestration node 104 (e.g., the environment checkpoint administration module 330 of the environment 300 (see FIG. 3)) that indicates to the checkpoint management module 420 to restore the execution state of a distributed application. In response, the checkpoint management module 420 may pause executing any presently executing applications and start execution of one or more applications based on the checkpoint restore signal and/or any additional environment checkpointing data. Accordingly, the checkpoint management module 420 may use the hardware checkpoint support 204 of the processor 202 to restore the execution state based on the checkpointing data 402 and/or the environment checkpointing data 302. It should be appreciated that the presently executing applications paused as a result of the restore operation may or may not be the same applications.

Figure 5:
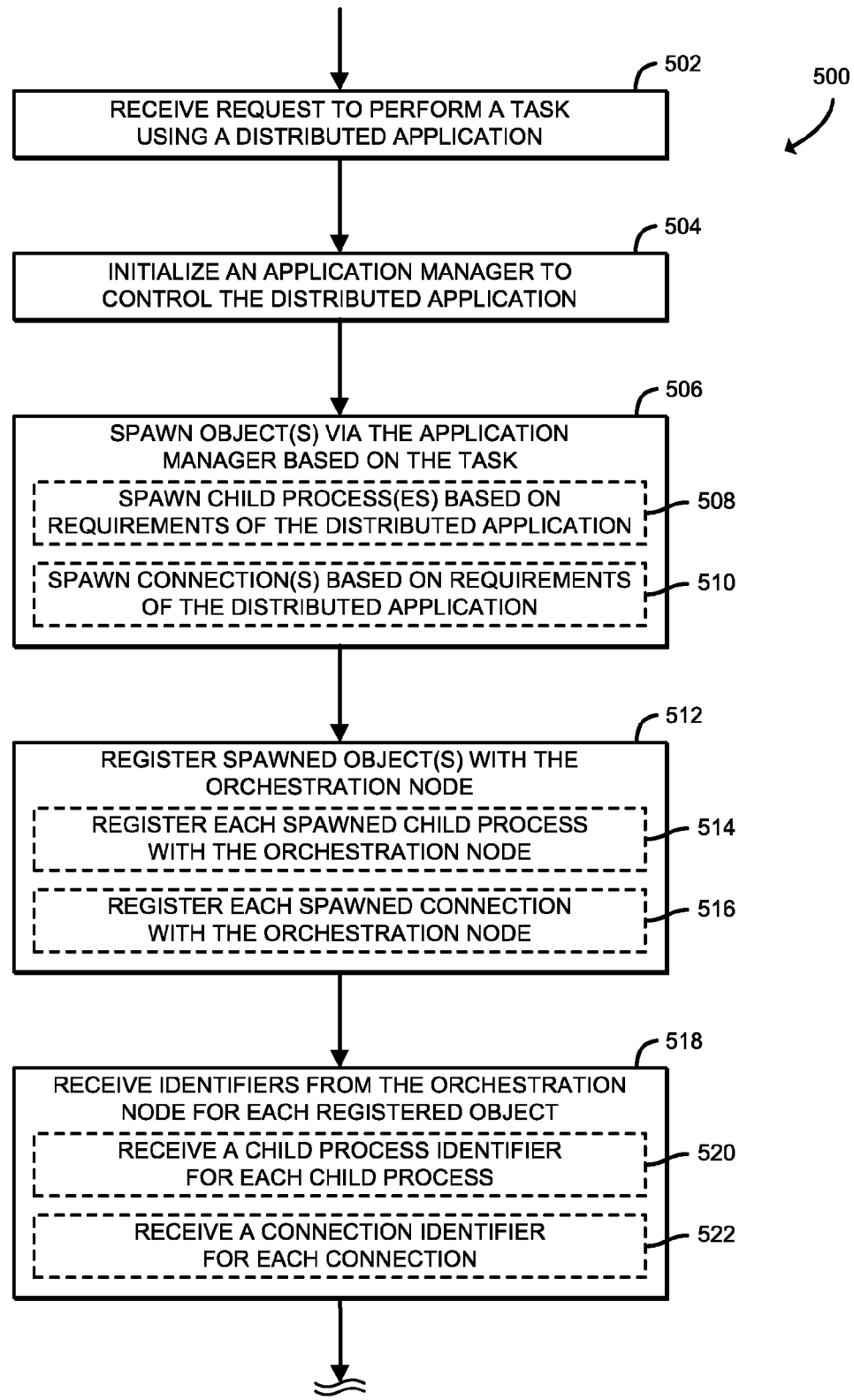
FIG. 5 is a simplified flow diagram of at least one embodiment of a method for initializing a distributed application that may be executed by one or more of the working computing nodes of FIG. 4.

Referring now to FIG. 5, in use, a working computing node 110 (i.e., illustratively, the computing node 106 or the computing node 108) may execute a method 500 for initializing a distributed application. The method 500 begins at block 502, in which the working computing node 110 receives a request to perform a task, such as processing a workload, via a distributed application. At block 504, the working computing node 110 initializes the distributed application via an application management module (e.g., the application management module 422 of FIG. 4) to control the distributed application. Accordingly, in some embodiments, the application management module 422 may be embodied as a hypervisor, main process, or master thread to execute and manage one or more of the applications 410 of FIG. 4. As described above, the applications 410 may be embodied as any process, thread, managed code, or other task executed by the working computing node 110. In some embodiments, the applications 410 may be embodied as virtualized applications, for example as applications or operating systems executed by a hypervisor and performed in a virtual machine created by the distributed application coordinator. During execution, the applications 410 may perform calculations, update regions of the memory 212, or perform any other operations typical of a computer application.

At block 506, the application management module 422 of the working node 110 spawns objects based on the task to be performed via the distributed application. For example, in some embodiments, one or more child processes may be spawned based on requirements of the distributed application at block 508. In such embodiments, each spawned child process may be run via a virtual machine instance or directly by the working computing node 110. Accordingly, in such embodiments, one or more virtual machines may need to be spawned based on the child processes spawned. Additionally or alternatively, in some embodiments, one or more connections may be spawned based on the requirements of the distributed application at block 510.

At block 512, the working computing node 110 registers the one or more spawned objects with the orchestration node 104. To do so, at block 514 in some embodiments, the working computing node 110 may register each of the spawned child processes with the orchestration node 104. As described previously, in some embodiments, the spawned child processes may be running on either a virtual machine or directly by the working computing node 110. Accordingly, the virtual machine instances may also be registered with the orchestration node 104. Additionally or alternatively, at block 516 in some embodiments, such as those embodiments wherein the application is a distributed application, the working computing node 110 may register each of the spawned connections between applications with the orchestration node 104, such as for multi-tiered application embodiments. At block 518, the working computing node 110 receives identifiers from the orchestration node 104 for each of the objects registered with the orchestration node 104. For example, at block 520, the orchestration node 104 receives a child process identifier for each child process registered with the orchestration node 104. Additionally or alternatively, in some embodiments, at block 522, the orchestration node 104 receives the identifiers includes receiving a connection identifier for each of the connections registered with the orchestration node 104.

Figure 6:
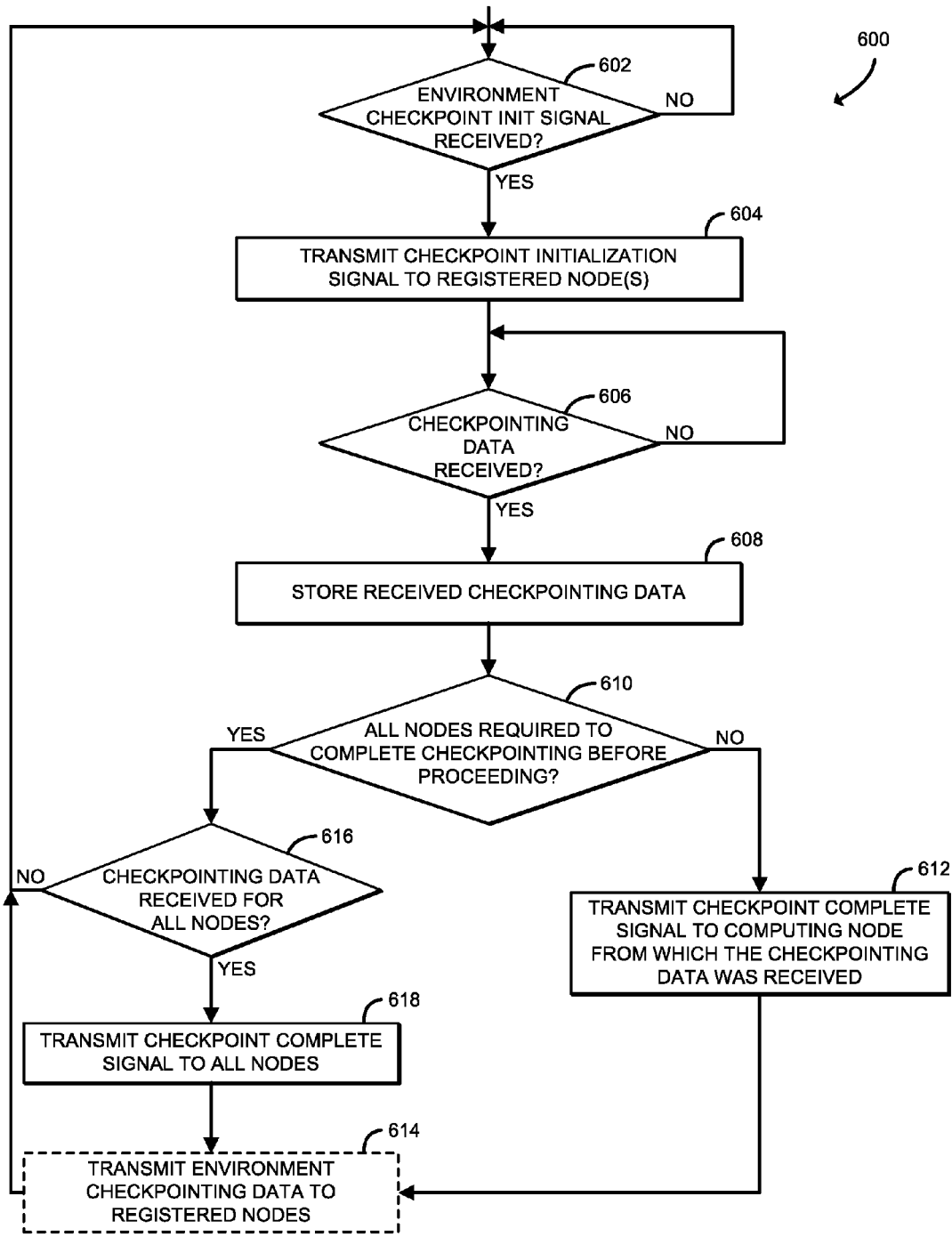
FIG. 6 is a simplified flow diagram of at least one embodiment of a method for administering an environment checkpointing event that may be executed by the orchestration node of FIG. 3.

Referring now to FIG. 6, in use, the orchestration node 104 may execute a method 600 for performing an environment checkpointing event. The method 600 begins at block 602, in which the orchestration node 104 determines whether an environment checkpoint initialization signal was received. An environment checkpoint initialization signal may include time sync information and may be embodied as any hardware or software event that triggers a checkpointing operation. The orchestration node 104 may use any technique to monitor for environment checkpoint initialization signals, including polling for events, handling interrupts, registering callback functions or event listeners, or other techniques. The environment checkpoint initialization signal may be embodied as a hardware event such as an interrupt, a memory access, or an I/O operation; as a software event such as a modification of a data structure in memory; as a user-generated event such as an application programming interface (API) call, or as any other event.

If the environment checkpoint initialization signal was not received, the method loops back to block 602 to continue to monitor for the environment checkpoint initialization signal. If the environment checkpoint initialization signal was received, the method 600 advances to block 604, wherein the orchestration node 104 transmits (e.g., via the backplane management controller 112 of FIG. 1) a checkpoint initialization signal to one or more of the working computing nodes 110 (e.g., illustratively, the computing node 106 or the computing node 108) registered with the orchestration node 104. In other words, the orchestration node 104 may only transmit the checkpoint initialization signal to a subset of the registered working computing nodes 110 at a time. For example, the checkpointing event may be directed to a particular application, which may be distributed across multiple virtual machines on a single working computing node 110 or across a number of working computing nodes 110. Accordingly, a checkpoint initialization signal may only be sent to those computing node(s) that are processing the distributed application.

At block 606, the orchestration node 104 determines whether checkpointing data has been received from one of the working computing nodes 110 (e.g., illustratively, the computing node 106 or the computing node 108). As described previously, the checkpointing data may include saved execution states or other, similar data. If checkpointing data has not been received, the method 600 loops back to block 606 to continue to monitor for checkpointing data. If checkpointing data has been received, the method 600 advances to block 608, wherein the orchestration node 104 stores the received checkpointing data. In some embodiments, the checkpointing data may be stored in the data storage device 214 or the checkpoint cache 218 of FIG. 2.

At block 610, the orchestration node 104 determines whether all of the working computing nodes 110 to which the checkpoint initialization signals were transmitted are required to be completed (i.e., checkpointing data received by the orchestration node 104) before proceeding. If so, the method 600 branches to block 616, which is described in further detail below; otherwise, the method 600 advances to block 612, wherein the orchestration node 104 transmits a checkpoint complete signal to the working computing node 110 from which the checkpointing data was received. In some embodiments, the method 600 may advance to block 614, wherein the orchestration node 104 transmits the environment checkpointing data (i.e., the checkpointing data for all of the working computing nodes 110) to registered working computing nodes 110 such that in the event the orchestration node 104 crashes, another working computing node 110 may assume the role of the orchestration node 104, thus avoiding a single point of failure. In some embodiments, the environment checkpointing data may include a hash table of the state of various connections and processes associated with each distributed application for each working computing node 110 of the compute environment 114.

At block 616, the orchestration node 104 determines whether the checkpointing data has been received from all of the working computing nodes 110 to which the checkpoint initialization signals were transmitted. If not, the method 600 loops back to block 602 to continue monitoring for checkpointing data received at the orchestration node 104; otherwise, the method 600 advances to block 618. At block 618, the orchestration node 104 transmits a checkpoint complete signal to all of the working computing nodes 110 to which the checkpoint initialization signals were transmitted. In some embodiments, the method advances from block 618 to block 614 to transmit the environment checkpointing data to all the registered working computing nodes 110.

Figure 7:
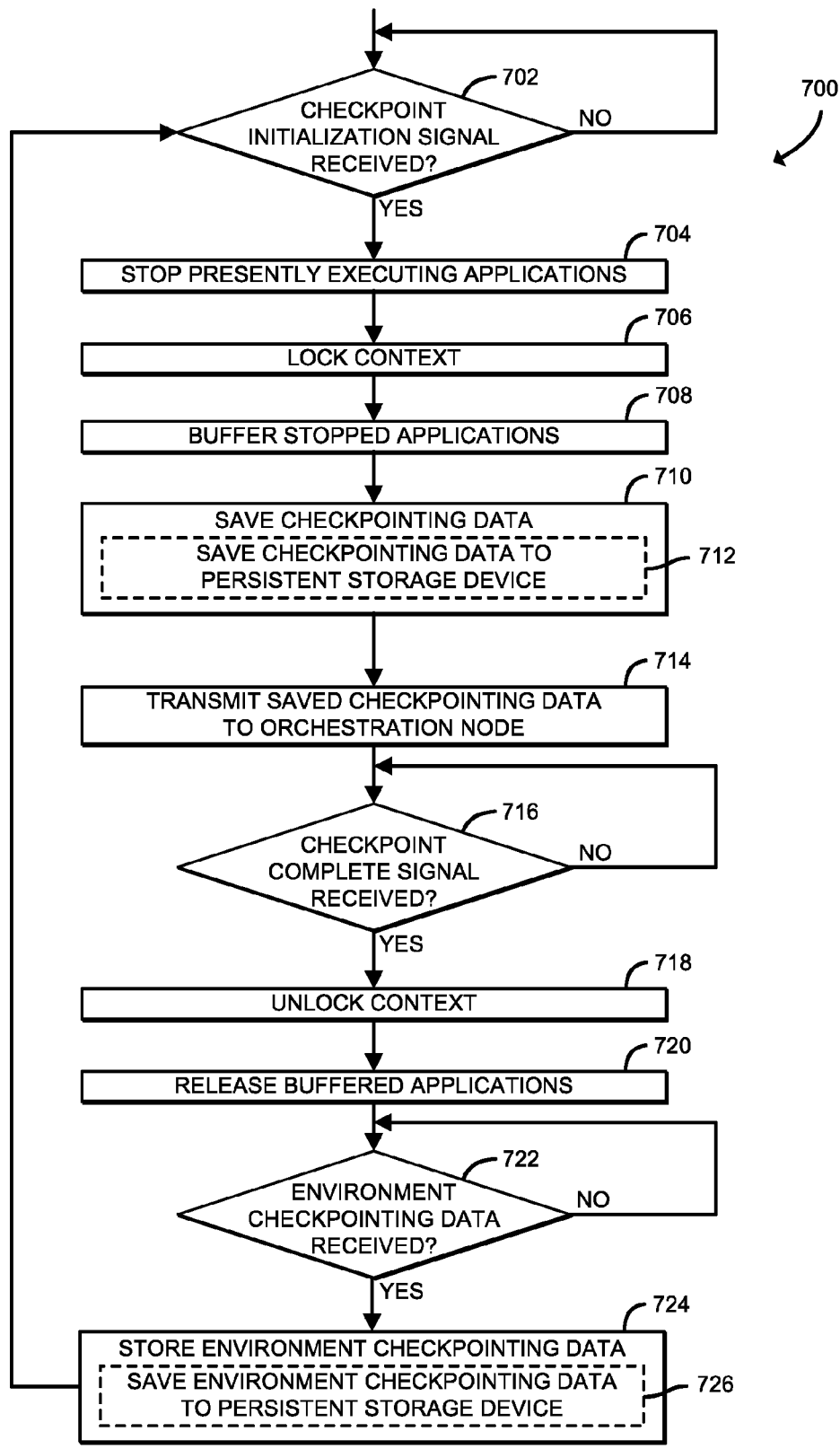
FIG. 7 is a simplified flow diagram of at least one embodiment of a method for performing a checkpointing event that may be executed by one or more of the working computing nodes of FIG. 4.

Referring now to FIG. 7, in use, each working computing node 110 (i.e., illustratively, the computing node 106 or the computing node 108) may execute a method 700 for performing a checkpointing event. The method 700 begins at block 702, in which the working computing node 110 determines whether a checkpoint initialization signal was received. As described previously, the checkpoint initialization signal may include time sync information and may be embodied as any hardware or software event that triggers a checkpointing operation.

The working computing node 110 may use any technique to monitor for checkpoint initialization signals, including polling for events, handling interrupts, registering callback functions or event listeners, or other techniques. For example, during initialization of the working computing node 110, the working computing node 110 may perform any initialization routines or other processes required to activate the hardware checkpoint support 204, as well as any required software initialization routines. In such embodiments, the working computing node 110 may initialize interrupt vectors, timers, or other system hooks used to invoke the hardware checkpoint support 204.

If the checkpoint initialization signal was not received, the method loops back to block 702 to continue to monitor for the checkpoint initialization signal. If the checkpoint initialization signal was received, the method 700 advances to block 704, wherein the working computing node 110 pauses executing applications that are being executed at the time the checkpoint initialization signal was received. As described previously, during execution, the application (e.g., the application 410) is initialized by a main thread, which is responsible for performing the task associated with the application At block 706, the working computing node 110 locks the context of the computing node. In other words, any new data received at the working computing node 110 is blocked. At block 708, the working computing node 110 buffers the paused applications. To do so, the computing node 102 buffers and saves any memory pages, or states, that are lagging behind the main thread and flushes any memory pages, or states, that are ahead of the main thread.

At block 710, the working computing node 110 saves the checkpointing data, which may include saved execution states of the applications paused at block 704 and buffered at block 708, as well as any other data related to the state of the paused applications (e.g., the stack, the heap, the allocated pages, the process table, other parts of the memory 212, the processor 202 flags, states, or other processor 202 information, etc.). In some embodiments, software (e.g., the operating system) running on the working computing node 110 may execute a system hook (i.e., a hardware hook) to save the execution state of the applications that were executing at the time in which the checkpoint initialization signal was received. In such embodiments, the working computing node 110 may save the execution states of the applications using the hardware checkpoint support 204 of FIG. 2. The hardware hook may be embodied as any technique usable to invoke the hardware checkpoint support 204 of the processor 202. It should be appreciated that different software executing on the same working computing node 110 may execute different system hooks. In some embodiments, in block 712, the checkpointing data may be stored in a persistent storage device, such as the checkpoint cache 218 of FIG. 2.

At block 714, the working computing node 110 transmits the saved checkpointing data to the orchestration node 104. To do so, the working computing node 110 may transmit the saved checkpointing data via the backplane management controller 112 of FIG. 1. At block 716, the working computing node 110 determines whether a checkpoint complete signal was received from the orchestration node 104 in response to having transmitted the saved checkpointing data. As described previously, in some embodiments, the orchestration node 104 may be configured to wait until all of the working computing nodes 110 that received the checkpoint initialization signal to have responded with their respective checkpointing data before the orchestration node 104 may transmit the checkpoint complete signal to the applicable working computing nodes 110. Accordingly, if the checkpoint complete signal has not been received at block 716, the working computing node 110 loops back to block 716 to continue to monitor whether the checkpoint complete signal has been received. If the checkpoint complete signal has been received at block 716, the method 700 advances to block 718, wherein the context locked at block 706 is unlocked (i.e., new data is again accepted by the working computing node 110).

At block 720, the applications that were executing at the time the checkpoint initialization signal was received, and were subsequently paused and buffered, are released from the buffer. Upon release, the main thread continues processing the application. As described previously, in some embodiments, each working computing node 110 in the compute environment 114 may store a copy of the environment checkpointing data, which may include application state information for all the working computing node 110 of the compute environment 114, such that any working computing node 110 may be capable of being configured as the orchestration node 104. For example, in the event that a working computing node 110 that functioned as the orchestration node 104 crashed, or is otherwise unavailable, any other working computing node 110 of the environment can assume the role of the orchestration node 104. In such embodiments, at block 722, the working computing node 110 determines whether environment checkpointing data was received. If not, the working computing node 110 loops back to block 722 to continue to monitor for the environment checkpointing data; otherwise, the computing node advances to block 724. At block 724, the working computing node 110 stores the environment checkpointing data. In some embodiments, at block 726, the working computing node 110 stores the environment checkpointing data to a persistent storage device (e.g., the checkpoint cache 218 of FIG. 2). As described previously, in some embodiments, the environment checkpointing data may include a hash table of the state of various connections and processes associated with each distributed application for each working computing node 110 of the compute environment 114 in which the working computing node 110 is connected to.

Figure 8:
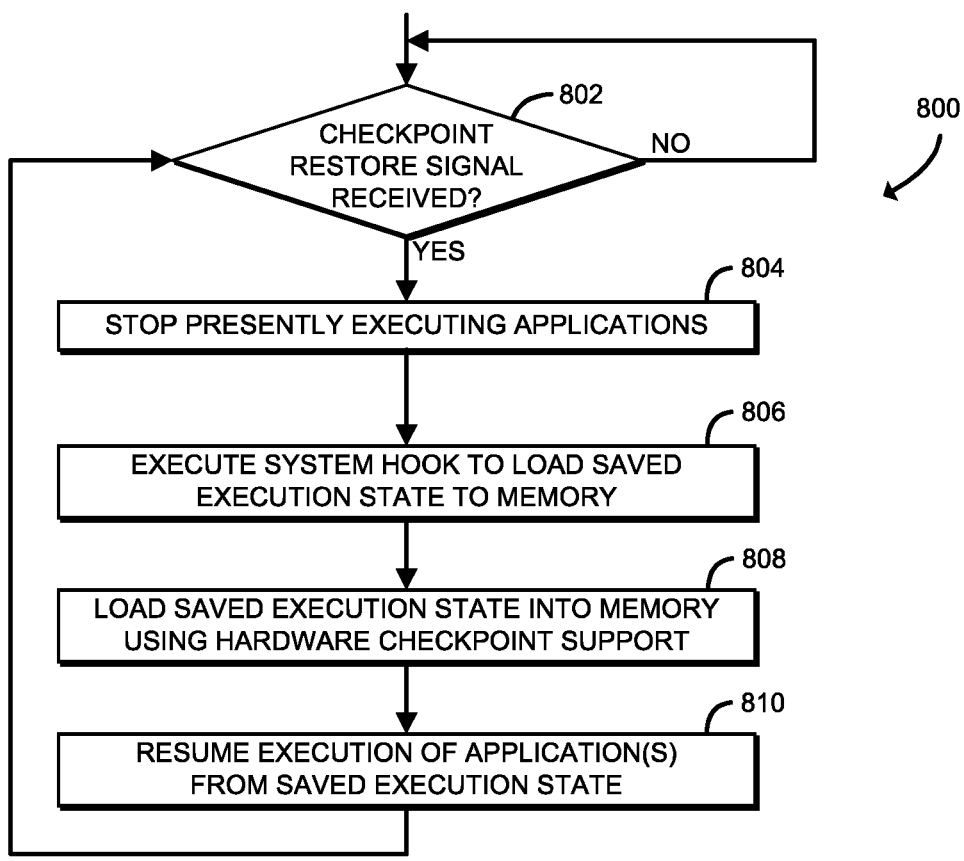
FIG. 8 is a simplified flow diagram of at least one embodiment for a method for performing an environment restore event that may be executed by one or more of the working computing nodes of FIG. 4.

Referring now to FIG. 8, in use, each working computing node 110 (i.e., the computing node 106 or the computing node 108) may execute a method 800 for performing an environment restore event. The method 800 begins at block 802, in which the computing node 102 determines whether a checkpoint restore signal was received. As described previously, the checkpoint restore signal may include data indicative of the environment checkpointing data to be referenced (i.e., used) for the restore. If the checkpoint restore signal was not received, the method loops back to block 802 to continue to monitor for the checkpoint initialization signal. If the checkpoint initialization signal was received, the method 800 advances to block 804, wherein the computing node 102 pauses executing applications that are being executed at the time the checkpoint initialization signal was received.

At block 806, the working computing node 110 executes a system hook to load the saved execution state of one or more requested applications (e.g., the application 410 of FIG. 4) into memory (e.g., the memory 212 of FIG. 2). Similar to saving the execution state, the system hook for loading the execution state may be embodied as any technique usable to invoke the hardware checkpoint support 204 of the processor 202. At block 808, the working computing node 110 loads the execution state of the requested applications to be restored into the memory 212 using the hardware checkpoint support 204. After loading the execution state of the requested applications to be restored into the memory 212, at block 810 the working computing node 110 resumes execution of the restored applications based on the saved execution state. After resuming the restored applications, the method 800 loops back to block 802 to continue monitoring for the presence of a checkpoint restore signal.

EXAMPLES

Illustrative examples of the technologies disclosed herein are provided below. An embodiment of the technologies may include any one or more, and any combination of, the examples described below.

Example 1 includes a computing node for performing a checkpointing event, the computing node comprising a hardware event monitor to receive a checkpoint initialization signal from an orchestration node communicatively coupled to the computing node; a checkpoint management module to (i) pause one or more applications being presently executed on the computing node in response to having received the checkpoint initialization signal and (ii) buffer, by an input/output (I/O) buffering device, input/output (I/O) signals of the one or more paused applications; and a hardware checkpoint support to save checkpointing data to a memory storage device of the computing node, wherein the checkpointing data includes an execution state of each of the one or more applications, wherein the checkpoint management module is further to transmit the checkpointing data to the orchestration node.

Example 2 includes the subject matter of Example 1, and wherein the checkpoint management module is further to lock context of the computing node to block any new data received by the computing node from being processed by the computing node in response to having received the checkpoint initialization signal.

Example 3 includes the subject matter of any of Examples 1 and 2, and wherein the hardware event monitor is further to receive, by the hardware event monitor, a checkpoint complete signal from the orchestration node, and wherein the checkpoint management module is further to resume the one or more paused applications in response to having received the checkpoint complete signal.

Example 4 includes the subject matter of any of Examples 1-3, and wherein to resume the one or more paused applications comprises to (i) unlock context of the computing node to allow any new data to be received by the computing node and (ii) release the input/output (I/O) signals of the one or more applications from the input/output (I/O) buffering device.

Example 5 includes the subject matter of any of Examples 1-4, and wherein the checkpoint management module is further to register with the orchestration node, wherein to register includes to provide an indication that the checkpointing event is to be initiated by the orchestration node.

Example 6 includes the subject matter of any of Examples 1-5, and wherein the checkpoint management module is further to (i) receive environment checkpointing data from the orchestration node, wherein the environment checkpointing data includes execution state data of other computing nodes communicatively coupled to the orchestration node, and (ii) store the environment checkpointing data in a local storage.

Example 7 includes the subject matter of any of Examples 1-6, and wherein the checkpoint management module is further to receive a checkpoint restore signal from the orchestration node, wherein the hardware checkpoint support is further to load a saved execution state of at least one of the one or more applications into a memory of the computing node, and wherein the checkpoint management module is further to resume execution of the at least one of the one or more applications from the saved execution stated loaded into the memory.

Example 8 includes the subject matter of any of Examples 1-7, and wherein to load the saved execution state comprises to load a saved execution state based at least in part on the environment checkpointing data.

Example 9 includes the subject matter of any of Examples 1-8, and wherein the checkpoint management module is further to execute a distributed application using a main thread initiated by the computing node, wherein to save the checkpointing data comprises to save an execution state of the distributed application, and wherein the execution state is indicative of a virtual memory state of the distributed application.

Example 10 includes the subject matter of any of Examples 1-9, and wherein the checkpoint management module is further to (i) save memory pages that correspond to a first application of the one or more applications in a memory of the computing node in response to a determination that the first application is lagging behind the main thread and (ii) flush memory pages that correspond to a second application of the one or more applications in the memory in response to a determination that the second application is working ahead of the main thread.

Example 11 includes the subject matter of any of Examples 1-10, and wherein to buffer the input/output (I/O) signals of the one or more paused applications comprises to buffer memory access events.

Example 12 includes the subject matter of any of Examples 1-11, and wherein to buffer the input/output (I/O) signals of the one or more paused applications comprises to buffer disk access events.

Example 13 includes the subject matter of any of Examples 1-12, and wherein to buffer the input/output (I/O) signals of the one or more paused applications comprises to buffer network access events.

Example 14 includes an orchestration node for administering an environment checkpointing event, the orchestration node comprising an environment checkpoint administration module to (i) transmit a checkpoint initialization signal to each of a plurality of working computing nodes communicatively coupled to the orchestration node in response to an environment checkpoint initialization signal indicative of a checkpoint event, (ii) receive checkpointing data from each working computing node in response to the checkpoint initialization signal, wherein the checkpoint data includes an execution state of at least one application of a corresponding working computing node, (iii) store the received checkpointing data, and (iv) transmit a checkpoint complete signal to each of the plurality of working computing nodes.

Example 15 includes the subject matter of Example 14, and wherein to transmit the checkpoint complete signal to the plurality of working computing nodes comprises to transmit the checkpoint complete signal to the plurality of working computing nodes in response to a determination that the checkpointing data has been received from each of the plurality of working computing nodes.

Example 16 includes the subject matter of any of Examples 14 and 15, and wherein the environment checkpoint administration module is further to transmit the received checkpointing data from each of the plurality of working computing nodes to each of the plurality of working computing nodes communicatively coupled to and registered with the orchestration node.

Example 17 includes a method for performing a checkpointing event, the method comprising receiving, by a hardware event monitor of a computing node, a checkpoint initialization signal from an orchestration node communicatively coupled to the computing node; pausing, by a processor of the computing node, one or more applications presently executing on the computing node in response to receiving the checkpoint initialization signal; buffering, by an input/output (I/O) buffering device of the computing node, input/output (I/O) signals of the one or more paused applications; saving, by a hardware checkpoint support of the computing node, checkpointing data to a memory storage device of the computing node, wherein the checkpointing data includes an execution state of each of the one or more applications; and transmitting, by the computing node, the checkpointing data to the orchestration node.

Example 18 includes the subject matter of Example 17, and further including locking, by the computing node, context of the computing node to block any new data received by the computing node from being processed by the computing node in response to receiving the checkpoint initialization signal.

Example 19 includes the subject matter of any of Examples 17 and 18, and further including receiving, by the hardware event monitor of a computing node, a checkpoint complete signal from the orchestration node; and resuming the one or more paused applications in response to receiving the checkpoint complete signal.

Example 20 includes the subject matter of any of Examples 17-19, and wherein resuming the one or more paused applications comprises (i) unlocking context of the computing node to allow any new data to be received by the computing node and (ii) releasing the input/output (I/O) signals of the one or more applications from the input/output (I/O) buffering device of the computing node.

Example 21 includes the subject matter of any of Examples 17-20, and further including registering, by the computing node, with the orchestration node to provide an indication that the checkpointing event is to be initiated by the orchestration node.

Example 22 includes the subject matter of any of Examples 17-21, and further including receiving, by the computing node, environment checkpointing data from the orchestration node, wherein the environment checkpointing data includes execution state data of other computing nodes communicatively coupled to the orchestration node; and storing, by the computing node, the environment checkpointing data in a local storage.

Example 23 includes the subject matter of any of Examples 17-22, and further including receiving, by the computing node, a checkpoint restore signal from the orchestration node; loading, by the hardware checkpoint support, a saved execution state of at least one of the one or more applications into a memory of the computing node; and resuming, by the computing node, execution of the at least one of the one or more applications from the saved execution stated loaded into the memory.

Example 24 includes the subject matter of any of Examples 17-23, and wherein loading the saved execution state comprises loading a saved execution state based at least in part on the environment checkpointing data.

Example 25 includes the subject matter of any of Examples 17-24, and further including executing, by the computing node, a distributed application using a main thread initiated by the computing node; wherein saving the checkpointing data comprises saving an execution state of the distributed application, and wherein the execution state is indicative of a virtual memory state of the distributed application.

Example 26 includes the subject matter of any of Examples 17-25, and further including saving memory pages, stored in a memory of the computing node, corresponding to a first application of the one or more applications in response to a determination that the first application is lagging behind the main thread; and flushing memory pages, stored in the memory, corresponding to a second application of the one or more applications in response to a determination that the second application is working ahead of the main thread.

Example 27 includes the subject matter of any of Examples 17-26, and wherein buffering the input/output (I/O) signals of the one or more paused applications comprises buffering memory access events.

Example 28 includes the subject matter of any of Examples 17-27, and wherein buffering the input/output (I/O) signals of the one or more paused applications comprises buffering disk access events.

Example 29 includes the subject matter of any of Examples 17-28, and wherein buffering the input/output (I/O) signals of the one or more paused applications comprises buffering network access events.

Example 30 includes a computing node comprising a processor; and a memory having stored therein a plurality of instructions that when executed by the processor cause the computing node to perform the method of any of Examples 17-29.

Example 31 includes one or more machine readable storage media comprising a plurality of instructions stored thereon that in response to being executed result in a computing node performing the method of any of Examples 17-29.

Example 32 includes a method for administering an environment checkpointing event, the method comprising transmitting, by an orchestration node, a checkpoint initialization signal to each of a plurality of working computing nodes communicatively coupled to the orchestration node in response to an environment checkpoint initialization signal indicative of a checkpoint event; receiving, by the orchestration node, checkpointing data from each working computing node in response to the checkpoint initialization signal, wherein the checkpoint data includes an execution state of at least one application of a corresponding working computing node; storing, by a memory storage device of the orchestration node, the received checkpointing data; transmitting, by the orchestration node, a checkpoint complete signal to each of the plurality of working computing nodes.

Example 33 includes the subject matter of Example 32, and wherein transmitting the checkpoint complete signal to the plurality of working computing nodes comprises transmitting the checkpoint complete signal to the plurality of working computing nodes in response to a determination that the checkpointing data has been received from each of the plurality of working computing nodes.

Example 34 includes the subject matter of any of Examples 32 and 33, and further including transmitting, by the orchestration node, the received checkpointing data from each of the plurality of working computing nodes to each of the plurality of working computing nodes communicatively coupled to and registered with the orchestration node.

Example 35 includes a computing node comprising a processor; and a memory having stored therein a plurality of instructions that when executed by the processor cause the computing node to perform the method of any of Examples 32-34.

Example 36 includes one or more machine readable storage media comprising a plurality of instructions stored thereon that in response to being executed result in a computing node performing the method of any of Examples 32-34.

Example 37 includes a computing node for performing a checkpointing event, the computing node comprising means for receiving a checkpoint initialization signal from an orchestration node communicatively coupled to the computing node; means for pausing one or more applications presently executing on the computing node in response to receiving the checkpoint initialization signal; means for buffering input/output (I/O) signals of the one or more paused applications; means for saving checkpointing data to a memory storage device of the computing node, wherein the checkpointing data includes an execution state of each of the one or more applications; and means for transmitting the checkpointing data to the orchestration node.

Example 38 includes the subject matter of Example 37, and further including means for locking context of the computing node to block any new data received by the computing node from being processed by the computing node in response to receiving the checkpoint initialization signal.

Example 39 includes the subject matter of any of Examples 37 and 38, and further including means for receiving a checkpoint complete signal from the orchestration node; and means for resuming the one or more paused applications in response to receiving the checkpoint complete signal.

Example 40 includes the subject matter of any of Examples 37-39, and wherein the means for resuming the one or more paused applications comprises means for (i) unlocking context of the computing node to allow any new data to be received by the computing node and (ii) releasing the input/output (I/O) signals of the one or more applications.

Example 41 includes the subject matter of any of Examples 37-40, and further including means for registering with the orchestration node to provide an indication that the checkpointing event is to be initiated by the orchestration node.

Example 42 includes the subject matter of any of Examples 37-41, and further including means for receiving environment checkpointing data from the orchestration node, wherein the environment checkpointing data includes execution state data of other computing nodes communicatively coupled to the orchestration node; and means for storing the environment checkpointing data in a local storage.

Example 43 includes the subject matter of any of Examples 37-42, and further including means for receiving a checkpoint restore signal from the orchestration node; means for loading a saved execution state of at least one of the one or more applications into a memory of the computing node; and means for resuming execution of the at least one of the one or more applications from the saved execution stated loaded into the memory.

Example 44 includes the subject matter of any of Examples 37-43, and wherein the means for loading the saved execution state comprises means for loading a saved execution state based at least in part on the environment checkpointing data.

Example 45 includes the subject matter of any of Examples 37-44, and further including means for executing a distributed application using a main thread initiated by the computing node; wherein the means for saving the checkpointing data comprises means for saving an execution state of the distributed application, and wherein the execution state is indicative of a virtual memory state of the distributed application.

Example 46 includes the subject matter of any of Examples 37-45, and further including means for saving memory pages, stored in a memory of the computing node, corresponding to a first application of the one or more applications in response to a determination that the first application is lagging behind the main thread; and means for flushing memory pages, stored in the memory, corresponding to a second application of the one or more applications in response to a determination that the second application is working ahead of the main thread.

Example 47 includes the subject matter of any of Examples 37-46, and wherein the means for buffering the input/output (I/O) signals of the one or more paused applications comprises means for buffering memory access events.

Example 48 includes the subject matter of any of Examples 37-47, and wherein the means for buffering the input/output (I/O) signals of the one or more paused applications comprises means for buffering disk access events.

Example 49 includes the subject matter of any of Examples 37-48, and wherein the means for buffering the input/output (I/O) signals of the one or more paused applications comprises means for buffering network access events.

Example 50 includes an orchestration node for administering an environment checkpointing event, the orchestration node comprising means for transmitting a checkpoint initialization signal to each of a plurality of working computing nodes communicatively coupled to the orchestration node in response to an environment checkpoint initialization signal indicative of a checkpoint event; means for receiving checkpointing data from each working computing node in response to the checkpoint initialization signal, wherein the checkpoint data includes an execution state of at least one application of a corresponding working computing node; means for storing the received checkpointing data; means for transmitting a checkpoint complete signal to each of the plurality of working computing nodes.

Example 51 includes the subject matter of Example 50, and wherein the means for transmitting the checkpoint complete signal to the plurality of working computing nodes comprises means for transmitting the checkpoint complete signal to the plurality of working computing nodes in response to a determination that the checkpointing data has been received from each of the plurality of working computing nodes.

Example 52 includes the subject matter of any of Examples 50 and 51, and further including means for transmitting the received checkpointing data from each of the plurality of working computing nodes to each of the plurality of working computing nodes communicatively coupled to and registered with the orchestration node.

The invention claimed is:
1. A computing node for performing a checkpointing event, the computing node comprising:
a hardware event monitor to receive a checkpoint initialization signal from an orchestration node communicatively coupled to the computing node;

a checkpoint management module to (i) pause one or more applications being presently executed on the computing node in response to having received the checkpoint initialization signal and (ii) buffer, by an input/output (I/O) buffering device, input/output (I/O) signals of the one or more paused applications; and a hardware checkpoint support to save checkpointing data to a memory storage device of the computing node, wherein the checkpointing data includes an execution state of each of the one or more applications, wherein the checkpoint management module is further to transmit the checkpointing data to the orchestration node.

2. The computing node of claim 1, wherein the checkpoint management module is further to lock context of the computing node to block any new data received by the computing node from being processed by the computing node in response to having received the checkpoint initialization signal.

3. The computing node of claim 2, wherein the hardware event monitor is further to receive, by the hardware event monitor, a checkpoint complete signal from the orchestration node, and wherein the checkpoint management module is further to resume the one or more paused applications in response to having received the checkpoint complete signal, and wherein to resume the one or more paused applications comprises to (i) unlock context of the computing node to allow any new data to be received by the computing node and (ii) release the input/output (I/O) signals of the one or more applications from the input/output (I/O) buffering device.

4. The computing node of claim 1, wherein the checkpoint management module is further to register with the orchestration node, wherein to register includes to provide an indication that the checkpointing event is to be initiated by the orchestration node.

5. The computing node of claim 4, wherein the checkpoint management module is further to (i) receive environment checkpointing data from the orchestration node, wherein the environment checkpointing data includes execution state data of other computing nodes communicatively coupled to the orchestration node, and (ii) store the environment checkpointing data in a local storage.

6. The computing node of claim 5, wherein the checkpoint management module is further to receive a checkpoint restore signal from the orchestration node, wherein the hardware checkpoint support is further to load a saved execution state of at least one of the one or more applications into a memory of the computing node, and wherein the checkpoint management module is further to resume execution of the at least one of the one or more applications from the saved execution stated loaded into the memory.

7. The computing node of claim 1, wherein the checkpoint management module is further to execute a distributed application using a main thread initiated by the computing node, wherein to save the checkpointing data comprises to save an execution state of the distributed application, and wherein the execution state is indicative of a virtual memory state of the distributed application.

8. The computing node of claim 7, wherein the checkpoint management module is further to (i) save memory pages that correspond to a first application of the one or more applications in a memory of the computing node in response to a determination that the first application is lagging behind the main thread and (ii) flush memory pages that correspond to a second application of the one or more applications in the memory in response to a determination that the second application is working ahead of the main thread.

9. The computing node of claim 1, wherein to buffer the input/output (I/O) signals of the one or more paused applications comprises to buffer at least one of memory access events, disk access events, and network access events.

10. An orchestration node for administering an environment checkpointing event, the orchestration node comprising:

an environment checkpoint administration module to (i) transmit a checkpoint initialization signal to each of a plurality of working computing nodes communicatively coupled to the orchestration node in response to an environment checkpoint initialization signal indicative of a checkpoint event, (ii) receive checkpointing data from each working computing node in response to the checkpoint initialization signal, wherein the checkpoint data includes an execution state of at least one application of a corresponding working computing node, (iii) store the received checkpointing data, and (iv) transmit a checkpoint complete signal to each of the plurality of working computing nodes.

11. The orchestration node of claim 10, wherein to transmit the checkpoint complete signal to the plurality of working computing nodes comprises to transmit the checkpoint complete signal to the plurality of working computing nodes in response to a determination that the checkpointing data has been received from each of the plurality of working computing nodes.

12. The orchestration node of claim 10, wherein the environment checkpoint administration module is further to transmit the received checkpointing data from each of the plurality of working computing nodes to each of the plurality of working computing nodes communicatively coupled to and registered with the orchestration node.

13. One or more non-transitory, computer-readable storage media comprising a plurality of instructions stored thereon that in response to being executed cause a computing node to:

receive, by a hardware event monitor of a computing node, a checkpoint initialization signal from an orchestration node communicatively coupled to the computing node;

pause, by a processor of the computing node, one or more applications presently executing on the computing node in response to receiving the checkpoint initialization signal;

buffer, by an input/output (I/O) buffering device of the computing node, input/output (I/O) signals of the one or more paused applications;

save, by a hardware checkpoint support of the computing node, checkpointing data to a memory storage device of the computing node, wherein the checkpointing data includes an execution state of each of the one or more applications; and transmit the checkpointing data to the orchestration node.

14. The one or more non-transitory, computer-readable storage media of claim 13, further comprising a plurality of instructions that in response to being executed cause the computing node to lock context of the computing node to block any new data received by the computing node from being processed by the computing node in response to receiving the checkpoint initialization signal.

15. The one or more non-transitory, computer-readable storage media of claim 14, further comprising a plurality of instructions that in response to being executed cause the computing node to:
receive, by the hardware event monitor of a computing node, a checkpoint complete signal from the orchestration node; and
resume the one or more paused applications in response to having received the checkpoint complete signal.

16. The one or more non-transitory, computer-readable storage media of claim 15, wherein to resume the one or more paused applications comprises to (i) unlock context of the computing node to allow any new data to be received by the computing node and (ii) release the input/output (I/O) signals of the one or more applications from the input/output (I/O) buffering device of the computing node.

17. The one or more non-transitory, computer-readable storage media of claim 13, further comprising a plurality of instructions that in response to being executed cause the computing node to register with the orchestration node to provide an indication that the checkpointing event is to be initiated by the orchestration node.

18. The one or more non-transitory, computer-readable storage media of claim 17, further comprising a plurality of instructions that in response to being executed cause the computing node to:
receive environment checkpointing data from the orchestration node, wherein the environment checkpointing data includes execution state data of other computing nodes communicatively coupled to the orchestration node; and
store the environment checkpointing data in a local storage.

19. The one or more non-transitory, computer-readable storage media of claim 18, further comprising a plurality of instructions that in response to being executed cause the computing node to:
receive a checkpoint restore signal from the orchestration node;
load, by the hardware checkpoint support, a saved execution state of at least one of the one or more applications into a memory of the computing node; and
resume execution of the at least one of the one or more applications from the saved execution stated loaded into the memory.

20. The one or more non-transitory, computer-readable storage media of claim 13, further comprising a plurality of instructions that in response to being executed cause the computing node to:
execute a distributed application using a main thread initiated by the computing node;
wherein to save the checkpointing data comprises to save an execution state of the distributed application, and wherein the execution state is indicative of a virtual memory state of the distributed application.

21. The one or more non-transitory, computer-readable storage media of claim 20, further comprising a plurality of instructions that in response to being executed cause the computing node to:
save memory pages, stored in a memory of the computing node, corresponding to a first application of the one or more applications in response to a determination that the first application is lagging behind the main thread; and
flush memory pages, stored in the memory, corresponding to a second application of the one or more applications in response to a determination that the second application is working ahead of the main thread.

22. The one or more non-transitory, computer-readable storage media of claim 13, wherein to buffer the input/output (I/O) signals of the one or more paused applications comprises to buffer at least one of memory access events, disk access events, and network access events.

23. One or more non-transitory, computer-readable storage media comprising a plurality of instructions stored thereon that in response to being executed cause an orchestration node to:
transmit a checkpoint initialization signal to each of a plurality of working computing nodes communicatively coupled to the orchestration node in response to an environment checkpoint initialization signal indicative of a checkpoint event;
receive checkpointing data from each working computing node in response to the checkpoint initialization signal, wherein the checkpoint data includes an execution state of at least one application of a corresponding working computing node;
store the received checkpointing data at a memory storage device of the orchestration node;
transmit a checkpoint complete signal to each of the plurality of working computing nodes.

24. The one or more non-transitory, computer-readable storage media of claim 23, wherein to transmit the checkpoint complete signal to the plurality of working computing nodes comprises to transmit the checkpoint complete signal to the plurality of working computing nodes in response to a determination that the checkpointing data has been received from each of the plurality of working computing nodes.

25. The one or more non-transitory, computer-readable storage media of claim 23, further comprising a plurality of instructions that in response to being executed cause the orchestration node to transmit the received checkpointing data from each of the plurality of working computing nodes to each of the plurality of working computing nodes communicatively coupled to and registered with the orchestration node.

* * * * *